Patented May 2, 1950

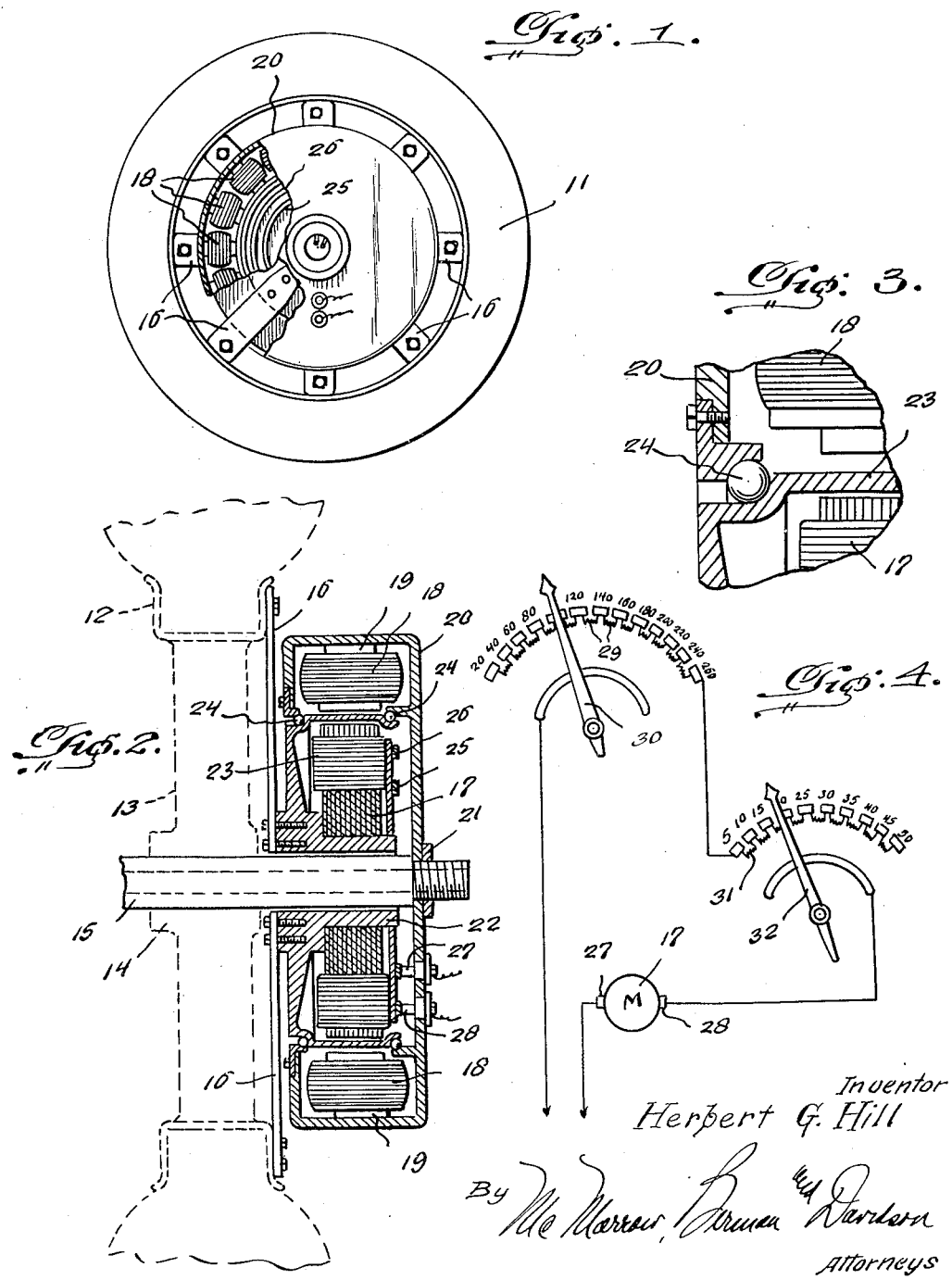

2,505,770

UNITED STATES PATENT OFFICE 2,505,770

DRIVE FOR AIRPLANE WHEELS

Herbert G. Hill, Jackson, Miss.

Application December 7, 1945, Serial No. 633,387

4 Claims. (Cl. 244—103)

This invention relates to airplane landing wheels, and more particularly to a device which is adapted to be attached to any well known type of an airplane wheel for driving the wheel at a speed corresponding to the speed of travel of the airplane while landing.

A main object of the invention is to provide a novel and improved drive means for an airplane landing wheel which is adapted to rotate the wheel at a speed corresponding to the speed of the airplane while landing, thereby reducing wear on the wheel, conserving rubber and reducing the hazards of landing the airplane.

A further object of the invention is to provide an improved drive device for airplane landing wheels which will enable a pilot to rotate the wheels of his plane while landing in synchronism with the air speed of the plane as reflected by his air speed indicator and by additional means associated with the drive device which may be set according to wind speed.

Further objects and advantages of the invention will appear from the following description and claims, and from the accompanying drawings, wherein:

Figure 1 is a side elevational view with certain parts broken away to show the interior construction of an airplane wheel equipped with the drive means of this invention.

Figure 2 is a transverse cross-sectional detail view of the wheel of Figure 1.

Figure 3 is an enlarged detail sectional view showing the bearing structure of the wheel of Figure 1.

Figure 4 is a schematic wiring diagram showing the speed control means for the wheel drive mechanism shown in Figure 1.

Referring to the drawings, 11 designates the wheel of an airplane, said wheel having a rim 12 and body structure 13 including a hub 14 which is freely rotatable with respect to a fixed shaft 15. Secured to rim 12 by a plurality of radial bars 16 is an armature 17 having conventional windings and adapted to cooperate with a plurality of peripherally spaced field coils 18 mounted on appropriate pole elements 19 to provide motor action, said pole elements being carried by a housing 20 of magnetic material which is rigidly connected to the end of shaft 15 by a tightly secured nut 21. Armature 17 is centrally supported on a non-magnetic inner core member 22 formed with an outer annular flange 23. The adjacent portions of annular flange 23 which flange and housing 20 are formed with complementary raceways to receive ball bearings 24 to support the armature 17 for rotation with respect to housing 20.

Armature 17 is provided with concentric collector rings 25, 26 which are respectively contacted by brush members 27, 28 carried by housing 20 and suitably insulated with respect to said housing. The brush members are connected to an appropriate source of electric current, such as a battery, shaft 15 being hollow so that the connecting wires may extend through the shaft into the body of the airplane.

As shown in Figure 4, the circuit for armature 17 has in series therewith a first rheostat 29 which includes the air speed indicator needle 30 of the airplane as the resistance-varying element thereof, and a second rheostat 31 which includes a manually adjustable indicator arm 32 as the resistance-varying element thereof. Indicator arm 32 is manually set by the airplane pilot to a position corresponding to the value of wind speed as furnished by the control tower of the landing field. The setting of automatic rheostat 29 in combination with the manual setting of rheostat 31 according to wind speed provides a calculated value of resistance in the series circuit including armature 17 which is adapted to rotate armature 17 at a speed which synchronizes the wheel 11 with the landing speed of the airplane.

Although only one wheel is shown in the drawings, it is of course understood that all the wheels of the plane are similarly equipped and that their armatures are connected in parallel so as to be rotated in unison. When landing, the pilot moves rheostat arm 32 to circuit closing position and sets said arm at a position corresponding to the reported wind speed at the landing field. The speed of rotation of the landing wheels will then be substantially synchronized with the actual landing speed of the airplane.

While a specific embodiment of drive means for airplane wheels has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. The combination with an airplane landing wheel and an axle therefor; of wheel-driving means for pre-rotating such wheel at a speed substantially corresponding to the landing speed of the airplane before contact of the wheel with the ground, and comprising an electric motor operatively connected between said wheel and said axle, means supplying electrical energy to said motor, and motor speed-regulating means operatively associated with said energy-supply means, said electric motor comprising an armature core member of non-magnetic material secured to said wheel and having an outer annular flange provided with ball raceways, a magnetic armature structure mounted on said core within said outer annular flange, a housing secured to said axle, a plurality of pole pieces carried by said housing surrounding the outer annular flange on said core member, field coils on said pole pieces, raceways on said housing complementary to the raceways on said core, anti-friction balls between said raceways, slip rings on said core, and brushes carried by said housing slidably contacting said rings, said outer annular flange of non-magnetic material extending between said magnetic armature structure and said field coils.

2. The combination with an airplane landing wheel and a non-rotatable axle upon which said wheel is journalled, of wheel driving means for pre-rotating such wheel at a speed substantially corresponding to the landing speed of the airplane, and means controlling the rotational speed of said wheel in accordance with actual wind velocity and indicated relative air speed of the airplane, said wheel driving means comprising a motor housing secured to said axle adjacent said wheel and held against rotation by said axle, a motor field structure secured in said housing, a motor armature in said housing rotatable within said field structure, an armature core secured to said wheel surrounding said axle and supporting said armature, an annular flange of non-magnetic material on said core extending into said housing between said armature and said field structure, adjacent portions of said housing and said flange having relatively opposed anti-friction ball raceways therein, and anti-friction balls in said raceways rotatively supporting said armature and armature core in said housing, and said speed controlling means comprising an energizing circuit for said wheel driving motor, a first rheostat in said circuit actuated in accordance with the indicated relative air speed of the airplane, and a second rheostat in said circuit manually adjustable in accordance with wind velocity data at the landing location.

3. The combination with an airplane landing wheel and a non-rotatable axle upon which said wheel is journalled, of wheel driving means for pre-rotating such wheel at a speed substantially corresponding to the landing speed of the airplane comprising a motor housing secured to said axle adjacent said wheel and held against rotation by said axle, a motor field structure secured in said housing, a motor armature rotatable within said field structure, a core secured to said wheel surrounding said axle and supporting said armature, an annular flange of non-magnetic material on said core extending into said housing between said armature and said field structure, adjacent portions of said housing and said flange having relatively opposed anti-friction ball raceways therein, and anti-friction balls in said raceways rotatively supporting said armature and said armature core in said housing.

4. The combination with an airplane landing wheel and a non-rotatable axle upon which said wheel is journalled, of wheel driving means for pre-rotating such wheel at a speed corresponding to the landing speed of the airplane prior to landing comprising a hollow, annular motor housing centrally secured to said axle adjacent said wheel and held by said axle against rotation, a motor field structure secured within the outer portion of said housing, a motor armature in said housing rotatable within said field structure, an armature core surrounding said axle within said housing and supporting said armature, means providing an anti-friction bearing between said armature core and said housing, and radially disposed bars drivingly connecting said armature core to said wheel.

HERBERT G. HILL.

REFERENCES CITED

The following references are of record in the file of this patent:

UNITED STATES PATENTS

| Number | Name | Date |
|---|---|---|
| 496,550 | Boynton | May 2, 1893 |
| 703,649 | Gill | July 1, 1902 |
| 1,982,242 | Bellanca | Nov. 27, 1934 |
| 2,320,547 | Tiger | June 1, 1943 |
| 2,391,952 | Dever | Jan. 1, 1946 |